F. B. TORREY.
Pins for Roller Bushings.

No. 151,176.                 Patented May 19, 1874.

Witnesses.
Ewell Dick
Martin Kratt.

Inventor.
Francis B. Torrey by
his atty Holbrook

UNITED STATES PATENT OFFICE.

FRANCIS B. TORREY, OF BATH, MAINE.

IMPROVEMENT IN PINS FOR ROLLER-BUSHINGS.

Specification forming part of Letters Patent No. 151,176, dated May 19, 1874; application filed February 11, 1874.

*To all whom it may concern:*

Be it known that I, FRANCIS B. TORREY, of Bath, Maine, have invented a certain new and useful Improvement in Pins for Roller-Bushings and Sheaves of Pulley-Blocks, of which the following is a specification:

This invention relates to the pin that constitutes the bearing or axis of the roller-bushings or sheaves of pulley-blocks.

Figure 1:
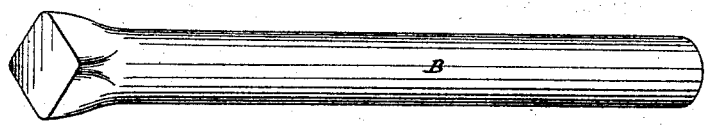
Figure 2:
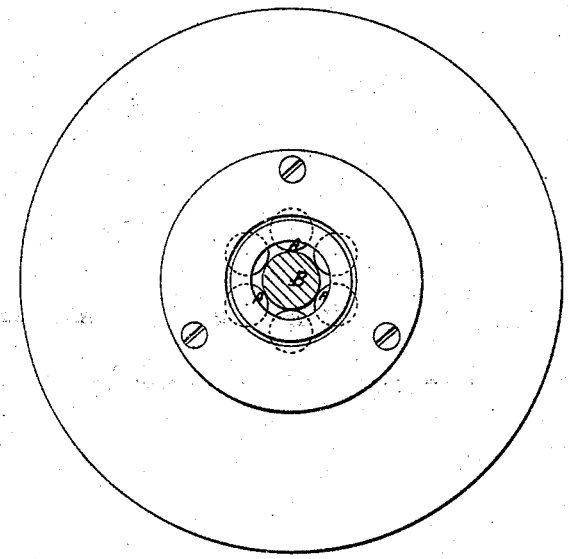

Figure 1 of the accompanying drawings repsents such a pin; and Fig. 2 is designed to illustrate the position that the pin occupies in a roller-bushing of a sheave or pulley, such a compressed roller-bushing, for instance, as patented to me on the 28th of March, 1871. The latter figure represents a side elevation of the bushing and pulley, with the pin, in section.

A are the rollers, and B the pin.

The pin has heretofore, so far as known to me, been made of wrought-iron, either in the rough or turned. In the practical manufacture and use of pulley-blocks provided with such pins, serious disadvantages and difficulties are experienced. In the first place the pin, whether in the rough or turned, is not very durable, and is liable to wear away by reason of the friction to which it is subjected. Then, again, when the pin is in the rough it is impracticable to obtain a truly cylindrical contour, and there are irregularities on its surface which abrade and groove and grind away the contiguous bearing-surfaces of the sheave or the roller-bushing. This difficulty is also experienced with a turned pin, for, unless the workman is exceedingly careful, the cutting-tool used in turning the pin will leave scores or ridges on the periphery of the pin, which have the same injurious action on the sheave or roller-bushing as the irregularities of the pin in the rough. Another almost insuperable objection to the turned pin is the cost of labor, and the time required for the turning operation, as well as the necessary waste or loss of stock. These all combine to render the turned pin very expensive, while its strength is, to say the least, not greater than that of the pin in the rough.

It has been my endeavor to remedy these difficuties, and to obtain a pin which shall be open to none of the objections above recited. To this end I have devised a cold-hammered pin, which, so far as I have been able to ascertain from long-continued experiments and trial, answers perfectly all the requisite conditions. I take in the rough a wrought-metal pin or bar of proper diameter, and this pin or bar I cold-hammer by putting it in its cold state in a die of proper shape, and hammering it with a drop, which, is connection with the die, will give it a truly cylindrical formation. The operation is quickly performed, and results in the production of a compressed cold-hammered pin, of truly cylindrical form, having a polished and smooth exterior, admirably adapted to form a bearing for roller-bushings or sheaves. It is also surface-hardened, its periphery having about the hardness and resistent power of machine steel, and its strength and durability are greatly increased. A pin thus made will last as long as two ordinary pins used under the same conditions. And to all these advantages are superadded the quickness and cheapness of manufacture, which enable me to produce the pin at a cost very little, if any, in excess of the pin in the rough.

I can make at least thirty pins in the manner above indicated in the time that is required to turn a single pin.

Having described my invention, and the manner in which the same is to be carried into effect, what I claim, and desire to secure by Letters Patent, is—

The wrought-iron, surface-hardened, and polished cylindrical pin for roller-bushings and sheaves of pulley-blocks, substantially as herein described.

In testimony whereof I have hereunto signed my name this 6th day of February, A. D. 1874.

FRANCIS B. TORREY.

Witnesses:
   H. D. MANSON,
   HERMAN E. STREET.